United States Patent Office 3,397,223
Patented Aug. 13, 1968

3,397,223
PREPARATION OF CYCLOPROPANE
DERIVATIVES
George B. Payne, Berkeley, Calif., assignor to Shell Oil
Company, New York, N.Y., a corporation of New
York
No Drawing. Filed May 19, 1966, Ser. No. 551,212
11 Claims. (Cl. 260—464)

ABSTRACT OF THE DISCLOSURE

Cyclopropane derivatives having a plurality of electron-withdrawing groups as ring substituents are prepared by reaction of stabilized sulfur ylids with ethylenic linkages of olenfinic reactants wherein the ethylenic linkages are activated by conjugation with an unsaturated moiety of an electron-withdrawing group.

---

This invention relates to an improved method for the production of multi-functional derivatives of cyclopropane and to certain novel cyclopropane derivatives produced thereby.

Methods for the production of cyclopropane and derivatives are known in the art. Conventional methods of producing the cyclopropane ring include dehalogenation of 1,3-dihalides with active metal, e.g., sodium or zinc, and the addition of a carbene to an olefinic double bond. Such methods are suitable for the production of simple derivatives of cyclopropane, but find limited application when cyclopropane derivatives of a more complex structure are desired. Of somewhat wider application in the formation of cyclopropane derivatives of more complex structure is the preparative method known as the Darzens Reaction. Bonavent et al., Bull. Soc. Chim. France, 2462 (1964), employ this procedure to prepare certain multi-functional cyclopropane derivatives in relatively low yield.

It is an object of the present invention to provide an improved method of producing cyclopropane derivatives having a plurality of functional groups attached to the cyclopropane ring. An additional object is to provide certain novel cyclopropane derivatives incorporating a plurality of functional groups as cyclopropane ring substituents.

It has now been found that these objects are accomplished by the process of intimately contacting certain stabilized sulfur ylids with olefinic compounds wherein an ethylenic carbon-carbon double bond is activated by conjugation with an unsaturated moiety of an electron-withdrawing substituent.

The sulfur ylid reactant comprises a molecular incorporating a moiety represented by the following resonance forms.

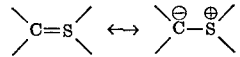

Although sulfur ylids of a variety of structural types are at least in part operable, the preferred class of sulfur ylids to be employed as reactants in the process of the invention comprises ylids of up to 15 carbon atoms represented by the formula

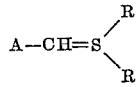

wherein A represents an electron-withdrawing group as is defined hereinbelow and R independently is lower alkyl, e.g., alkyl of up to 4 carbon atoms such as methyl, ethyl, propyl or butyl. It should be appreciated that the ylid molecule is the hybrid of several resonance structures involving polarization of the carbon-sulfur double bond and possible delocalization of any negative charge on the carbon atom by the neighboring A group, and that as a result no single structure adequately describes the ylid molecule. For convenience, however, the ylid is described in terms of the above formula which represents one contributing structure.

By the term "electron-withdrawing group" as employed hereinabove to define the A substituent is meant a multi-atom functional group which, when attached to an aromatic ring, is considered to be meta-directing and ring-deactivating. Illustrative of such groups are formyl, acyl, dialkylphosphono, carboxy, alkylsulfonyl, arylsulfonyl alkylsulfonate, nitro, carbamyl cyano, carbalkoxy and carbaryloxy. Preferred electron-withdrawing groups are free from aliphatic unsaturation and active hydrogen atoms and comprise an atom of carbon by means of which the electron-withdrawing group is linked to the remaining moiety of the ylid and is additionally multiply bonded to an atom of atomic number from 7 to 8 inclusive, i.e., nitrogen or oxygen. Representative of such preferred electron-withdrawing groups are cyano, carbalkoxy, carbaryloxy, alkanoyl, aryloyl and N,N-dialkylcarbamyl.

A variety of systems of nomenclature are applicable to the naming of the ylid reactants of the invention. As employed herein, the term "dialkylthioxo" is descriptive of the =SRR moiety. Thus, representative ylids include 2 - (dimethylthioxo)acetophenone, methyl (dipropylthioxo)acetate, ethyl (dimethylthioxo)acetate, (dimethylthioxo)acetonitrile, N,N - diethyl(diethylthioxo)acetamide, phenyl (dimethylthioxo)acetate, α - (dimethylthioxo)acetone and (diethylthioxo)acrylonitrile. Particularly useful are ylids of the above formula wherein each R is methyl, especially when the A term represents cyano, acyl, e.g., alkanoyl or aryloyl, or carbohydrocarbonoxy, e.g., carbalkoxy or carbaryloxy.

The ylid reactants are most easily prepared by dehydrohalogenation of the corresponding sulfonium halide. For example, dehydrohalogenation of carbethoxymethyldimethylsulfonium bromide results in the production of ethyl (dimethylthioxo)acetate. One method of effecting dehydrohalogenation of the sulfonium halide precursor of the ylid reactant comprises reacting the sulfonium halide with alkali metal or alkali metal hydride under anhydrous conditions according to the method of Speziale et al., J. Am. Chem. Soc., 87, 3562 (1965). A more suitable method of effecting the dehydrohalogenation comprises reacting the sulfonium halide with an essentially saturated aqueous solution of alkali metal carbonate containing at least a stoichiometric amount of alkali metal hydroxide. This procedure is described more fully and is claimed in applicant's copending application U.S. Ser. No. 551,233, filed of even date.

The olefinic reactant comprises an ethylenic carbon-carbon double bond activated by conjugation with unsaturation present in at least one non-hydrocarbyl functional group which is attached to a carbon atom which is a member of the ethylenic linkage. Broadly speaking, the olefinic reactants are characterized by the ability to serve as an acceptor in processes of Michael addition and ethylenic unsaturates suitably employed as acceptors in Michael additions are also suitably employed in the present process. An extensive discussion of the Michael addition reaction and the types of compounds suitably employed therein as acceptors is provided by Bergmann et al., "Organic Reactions," New York, John Wiley & Sons, Inc., 1959, Vol. 10, p. 179. One class of suitable olefinic reactants comprises those ethylenic compounds of up to 20 carbon atoms, preferably of up to 10, represented by the generic formula $$(R')(R'')C=C(R'')E$$

wherein E is an electron-withdrawing group as previously defined for the term A, e.g., formyl, acyl, dialkylphosphono, carboxy, alkylsulfonyl, arylsulfonyl, alkylsulfonate, nitro, carbamyl, cyano, carbalkoxy or carbaryloxy, R' is as defined below and R" is E or R' with the proviso that no more than one R" group is E. The R' term is hydrogen or an organic substituent of up to 10 carbon atoms which when connected to another substituent of one of the ethylenic carbon atoms forms a divalent, preferably alkylene, moiety or when monovalent is aliphatic or aromatic and is hydrocarbyl or is substituted-hydrocarbyl containing up to 3 non-hydrocarbyl substituents which are inert under the conditions of the reaction, e.g., E substituents or halo substituents, particularly halogen of atomic number from 17 to 35 inclusive, i.e., bromine or chlorine.

One sub-class of olefinic reactants of the above generic formula is represented by the formula $$(R')_2C=C\begin{matrix}R'\\E\end{matrix}$$

wherein R' and E have the previously stated significance. Illustrative of such olefinic reactants are acrolein, crotonaldehyde, methacrolein, methylvinyl ketone, mesityl oxide, 2-cyclohexen-1-one, ethyl acrylate, methyl methacrylate, ethyl crotonate, methyl cinnamate, dimethyl itaconate, propyl 4-chloro-2-butenoate, acrylonitrile, methacrylonitrile, crotononitrile, α-phenylacrylonitrile, acrylamide, N,N-diethylacrylamide, methyl vinyl sulfone, 2-sulfolene, phenyl crotyl sulfone, nitroethylene and O,O-dimethyl-vinylphosphonate.

A second sub-class of olefinic reactants of the above generic formula is represented by the formula $$(R')(E)C=C(R')E$$

wherein R' and E have the previously stated significance. It will be appreciated that in this latter formula, for example, wherein an E group is substituted on each carbon atom of the ethylenic linkage the possibility of cis-trans isomerism exists. Insofar as the operability of the process is concerned, the particular stereoisomerism is not material and utilization of either of the cis or trans isomers is suitable. Illustrative of this class of olefinic reactants are diethyl fumarate, diethyl maleate, dipropyl maleate, 1,2-dicyanoethylene, 1,2-dicyanocyclohexene, 3-cyanoacrolein, 2-butenedial and 3-carbethoxy-2-butenal.

The third sub-class of olefinic reactants of the above generic formula is represented by the formula $$(R')_2C=C(E)_2$$

wherein R' and E have the previously stated significance. Rather surprisingly, compounds of this latter formula wherein each E is acyl do not afford the desired cyclopropane derivatives and thus are excluded from the scope of the present invention. However, olefinic reactants of this latter formula wherein at least one E is of a type other than acyl provide satisfactory results. Exemplary olefinic compounds that are suitably employed include isopropylidinemalononitrile, ethyl isopropylidinecyanoacetate, diethyl isopropylidinemalonate, α-(methylsulfonyl)acrylonitrile, α-cyanocrotonaldehyde and 1,1-bis(phenylsulfonyl)-1-butene.

In general, olefinic reactants of the above generic formula wherein E is cyano, carbalkoxy and carbaryloxy of up to 8 carbon atoms or alkanoyl and aryloyl of up to 8 carbon atoms comprise a preferred class of reactants. Further preferred are those olefinic reactants wherein all substituents of the carbon atoms comprising the ethylenic linkage other than the E group(s) are hydrogen.

The molar ratio of the sulfur ylid to the olefinic reactant is not critical, and molar ratios of from about 5:1 to about 1:20 are satisfactory. It is generally desirable to provide an amount of olefinic reactant that is at least stoichiometric and molar ratios of sulfur ylid to olefinic reactant of from about 1:1 to about 1:5 are preferred.

The sulfur ylid and the olefinic reactant are contacted in the liquid phase in the presence of or in the substantial absence of reaction solvent. Suitable reaction solvents, when solvent is to be employed, are capable of dissolving both reactants, are liquid at the reaction temperature and pressure employed and are inert to the reactants as well as the products produced therefrom. Illustrative of such reaction solvents are hydrocarbons free from aliphatic unsaturation such as hexane, heptane, isooctane, benzene, toluene, cyclohexane and tetrahydronaphthalene; halogenated hydrocarbons such as chloroform, carbon tetrachloride and methylene bromide; ketones, preferably lower alkanones, such as acetone, methyl ethyl ketone and methyl isobutyl ketone; ethers, including dialkyl ethers such as diethyl ether, dibutyl ether, and methyl hexyl ether, cyclic ethers such as tetrahydrofuran, 1,4-dioxane and 1,3-dioxolane, and ethers (full) of polyhydric alcohols or poly(oxyalkylene) glycols such as dimethoxyethane, diethylene glycol dimethyl ether and tetraethylene glycol dimethyl ether; lower alkyl esters of lower alkanoic acids such as ethyl acetate, methyl propionate and ethyl butyrate; sulfones, e.g. methyl propyl sulfone, dibutyl sulfone and sulfolane; N,N-dialkylamides such as dimethylformamide, dimethylacetamide and diethylacetamide; and nitriles including acetonitrile, propionitrile and benzonitrile. The amount of solvent is not critical, and when the physical properties of the reaction mixture will allow no solvent is required. It is generally preferred to employ a reaction solvent, however, and when solvent is utilized a molar amount of solvent up to about 20 times the molar amount of limiting reactant is satisfactory.

The method of providing contact between the ylid and olefinic reactants is not material and one reactant may be added gradually to the other as by a slow addition of the ylid to the olefinic reactant, although it is equivalently useful to initially mix the entire amounts of reactants. The reaction of the ylid and olefinic reactants is conducted at moderate temperatures and reaction temperatures from about 0° C. to about 150° C. are satisfactory. Preferred, however, are reaction temperatures from about 25° C. to about 85° C. The reaction is conducted at any convenient pressure, provided that the reaction mixture is maintained substantially in the liquid phase. Largely for reasons of convenience, the use of a substantially atmospheric pressure, e.g., from about 0.5 atmosphere to about 10 atmospheres, is preferred. Subsequent to reaction, the product mixture is separated and the desired cyclopropane derivative is recovered by conventional methods, e.g., fractional distillation, selective extraction, fractional crystallization or the like.

The cyclopropane derivatives of the invention are produced by reaction of the sulfur ylid and the ethylenic reactant in a 1:1 molecular ratio. Although it is not desired to be bound by any particular theory, it is believed probable that a polarized form of the ylid adds to the activated carbon-carbon double bond of the olefinic reactant to form a non-isolable dipolar intermediate which eliminates dialkyl sulfide and effects charge neutralization by ring closure. In any event, the cyclopropane derivatives apparently result from combination of that moiety produced by removal of dialkylsulfide from the ylid and the combination thereof with the olefinic reactant, and dialkylsulfide is observed as a reaction product. In terms of the preferred reactants as defined above, the process of the invention may be represented by the following equation.

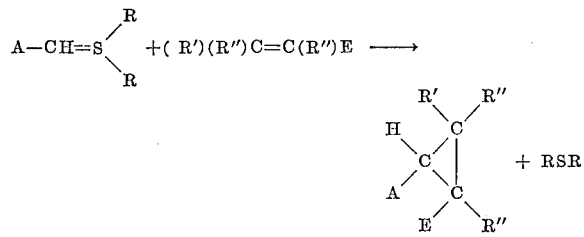

wherein R, R', R", A and E have the previously stated significance. In a specific example, ethyl (dimethylthioxo) acetate reacts with either diethyl fumarate or diethyl maleate to produce 1,2,3-tris(carbethoxy)cyclopropane and dimethylsulfide. Other illustrative cyclopropane products include 1-carbethoxy-2-formylcyclopropane, 1-acetyl - 2 - carbomethoxy-3,3-dimethylcyclopropane, 1-acetyl-2-cyanocyclopropane, 1,2 - bis(carbomethoxy)-1-methylcyclopropane, 1,2 - bis(carbomethoxy)-1-(carbomethoxymethyl)cyclopropane, 1-cyano-2-phenylsulfonylcyclopropane, 1 - carbethoxy-2-(N,N-dimethylcarbamyl)cyclopropane and 1,2 - bis(carbethoxy)-3-propylcyclopropane.

The cyclopropane products of the invention find utility in a variety of applications as chemical intermediates by providing a polyfunctional cyclopropane nucleus not readily obtainable by other methods. Products of the invention having at least one formyl, ester, carbamyl or cyano substituent are converted by conventional oxidation, hydrolysis and/or saponification processes to the corresponding carboxylic acid which is useful as an epoxy curing agent, particularly when polyfunctional. For example, from 1,2,3-tris(carbethoxy)cyclopropane is produced 1,2,3-tricarboxycyclopropane which, when used to cure epoxy compounds in conventional manner, imparts physical properties of strength to the resulting resin product because of the closely-knit, polyfunctional character of the curing agent incorporated into the resin. Similar utility is observed in the production of polyesters useful in fiber applications which are produced from condensation of the carbalkoxycyclopropane derivatives or the carboxylic acids derivable therefrom with polyols. Cyclopropane derivatives incorporating carbamyl or cyano substituents are converted by conventional procedures to corresponding amines, from which macromolecular polyamides useful in fiber applications are produced. Other cyclopropane derivatives find utility as precursors of agricultural chemicals. For example, reaction of ethyl (dimethylthioxo)acetate with 2,5-dimethyl-4-hexen-3-one results in the production of 1-(2-methylpropanoyl)-2-carbethoxy-3,3-dimethylcyclopropane which is convertible by known procedures to chrysanthemum acid, esters of which have established utility as insecticides.

To further illustrate the improved process of the invention and the novel products thereof, the following examples are provided. It should be understood that the details thereof are not to be regarded as limitations, as they may be varied as will be understood by one skilled in this art.

Example I

To a stirred solution of 14.8 g. of ethyl (dimethylthioxo)acetate in 100 ml. of refluxing acetone was added 7 ml. of acrolein in a dropwise manner over a 5-minute period. After an additional 10 minute reaction period, the mixture was distilled at reduced pressure to give 9.0 g., a 63% yield, of 1-carbethoxy-2-formylcyclopropane, B.P. 45° C. at less than 1 mm., $n_D^{25}$ 1.4488. The product, believed to be a novel compound, had the following elemental analysis.

*Analysis.*—Calc.: C, 59.1% wt.; H, 7.1% wt. Found: C, 59.3% wt.; H, 6.9% wt.

Example II

A solution of 5.0 g. of ethyl acrylate in 25 ml. of methylene chloride was added to a solution of 7.4 g. of ethyl (dimethylthioxo)acetate in 50 ml. of methylene chloride. The mildly exothermic reaction caused the reaction temperature to reach 30–35° C. After standing overnight at 25° C., the mixture was distilled at reduced pressure to give 7.8 g., an 84% yield, of 1,2-bis-(carbethoxy)cyclopropane, B.P. 70–71° C. at 1 mm., $n_D^{25}$ 1.4392.

Example III

To 53 g. of acrylonitrile maintained at 5–10° C. was added in a dropwise manner 14.8 g. of ethyl (dimethylthioxo)acetate. After 18 hours, the product mixture was vacuum-flashed to remove unreacted acrylonitrile and dimethyl sulfide and the residue was fractionally distilled at reduced pressure to give, inter alia, 3 g. of a fraction boiling at 52–68° C. at less than 1 mm. This fraction was found to be 1-carbethoxy-2-cyanocyclopropane, obtained in 22% yield based on converted acrylonitrile.

Example IV

To a solution of 43 g. of diethyl fumarate in 125 ml. of benzene was added a solution of 37 g. ethyl (dimethylthioxo)acetate in 125 ml. of benzene. The mixture maintained itself at 45–50° C. and when no longer exothermic was refluxed for 2 hours. The resulting product mixture was concentrated under vacuum and was fractionally distilled to give 59.0 g., a 91% yield, of 1,2,3-tris(carbethoxy)cyclopropane, B.P. 110–113° C. at less than 1 mm., $n_D^{25}$ 1.4474.

Example V

A series of runs was made wherein ethyl (dimethylthioxo)acetate was reacted with mesityl oxide in the presence of various solvents and also in the absence of solvent. The results of this series are given in Table I wherein the heading "Mole Ratio" represents the molar ratio of mesityl oxide to the ylid, the heading "Yield" indicates the yield of 2-acetyl-1-carbethoxy-3,3-dimethylcyclopropane product obtained upon fractional distillation of the product mixture and the heading "Purity" indicates the purity of the crude cyclopropane derivative as determined by gas-liquid chromatographic analysis.

TABLE I

| Solvent | Mole Ratio | Temp., °C. | Time, hrs. | Yield, percent | Purity, percent |
|---|---|---|---|---|---|
| Benzene | 3.0 | 80 | 18 | 75 | 98 |
| Chloroform | 3.0 | 70 | 8 | 57 | 91 |
| Acetone | 1.1 | 60 | 18 | 36 | 78 |
| Dimethoxyethane | 3.0 | 85 | 4 | 48 | 88 |
| Carbon tetrachloride | 3.0 | 80 | 16 | 52 | 90 |
| Toluene | 3.0 | 110 | 2 | 63 | 91 |
| Acetonitrile | 3.0 | 80 | 3 | 46 | 90 |
| Dimethylformamide | 3.0 | 80 | 3 | 44 | 87 |
| Ethyl acetate | 3.0 | 80 | 5 | 62 | 89 |
| None | 3.0 | 60 | 6 | 58 | 90 |
| Do | 3.0 | 25 | 168 | 65 | 97 |

Example VI

A series of runs was made wherein ethyl (dimethylthioxo)acetate was reacted with various monofunctional olefinic reactants in the presence or in the absence of solvent under varying reaction conditions. The results of this series are shown in Table II wherein the heading "Mole Ratio" indicates the molar ratio of olefinic reactant to ylid and the heading "Yield" indicates the yield of the designated product base on the ylid.

The following products whose production is illustrated in Table II are believed to be novel compounds: 1-carbethoxy-2-formyl-2-methylcyclopropane, B.P. 45° C. at less than 1 mm., $n_D^{25}$ 1.4487; 1-carbethoxy-2-formyl-2,3-dimethylcyclopropane, B.P. 64–66° C. at 1 mm., $n_D^{25}$ 1.4540; and 1,2 - bis(carbethoxy)-2-carbethoxymethylcyclopropane, B.P. 102–105° C. at less than 1 mm., $n_D^{25}$ 1.4510.

TABLE II

| Reactant | Mole Ratio | Solvent | Temp., °C. | Time, hrs. | Yield, percent | Product |
|---|---|---|---|---|---|---|
| Crotonaldehyde | 1.0 | Acetone | 60 | 0.3 | 50 | 1-carbethoxy-2-formyl-3-methylcyclopropane. |
| Methacrolein | 2.0 | Benzene | 80 | 1 | 86 | 1-carbethoxy-2-formyl-2-methylcyclopropane. |
| 2,3-dimethylacrolein | 2.0 | ...do... | 80 | 15 | 38 | 1-carbethoxy-2-formyl-2,3-dimethylcyclopropane. |
| Methyl vinyl ketone | 1.5 | $CH_2Cl_2$ | 45 | 2.5 | 87 | 1-acetyl-2-carbethoxycyclopropane. |
| 2,5-dimethyl-4-hexen-3-one | 3.0 | Benzene | 80 | 18 | 75 | 1-(2-methylpropanoyl)-2-carbethoxy-2,3-dimethylcyclopropane. |
| Acrylamide | 1.0 | Dimethoxyethane | 85 | 2 | 28 | 1-carbamyl-2-carbethoxycyclopropane. |
| Phenyl vinyl sulfone | 1.0 | Benzene | 25 | 18 | 59 | 1-carbethoxy-2-phenylsulfonylcyclopropane. |
| Dimethyl itaconate | 2.0 | ...do... | 80 | 18 | 89 | 1,2-bis(carbethoxy)-2-carbethoxymethylcyclopropane. |
| Ethyl crotonate | 2.0 | $CH_2Cl_2$ | 45 | 18 | 71 | 1,2-bis(carbethoxy)-3-methylcyclopropane. |
| Ethyl cinnamate | 1.5 | None | 25 | (1) | 47 | 1,2-bis(carbethoxy)-3-phenylcyclopropane. |
| Methyl methacrylate | 2.0 | $CH_2Cl_2$ | 45 | 18 | 69 | 1-carbethoxy-2-carbomethoxy-2-methylcyclopropane. |
| 2-cyclohexen-1-one | 3.0 | Benzene | 80 | 18 | 71 | 7-carbethoxybicyclo(4.1.0)heptan-2-one. |
| Acrylonitrile | 1.0 | $CH_2Cl_2$ | 45 | 18 | 64 | 1-carbethoxy-2-cyanocyclopropane. |
| Crotononitrile | 3.0 | None | 25 | 240 | 46 | 1-carbethoxy-2-cyano-3-methylcyclopropane. |

[1] 2 months.

Example VII

A series of runs was made wherein ethyl (dimethylthioxo)acetate was reacted with various difunctional olefinic reactants in the presence of various solvents under varying reaction conditions. The results of this series are shown in Table III wherein the column headings have the same significance as those of Table II.

TABLE III

| Reactant | Mole Ratio | Solvent | Temp., °C. | Time, hrs. | Yield, percent | Product |
|---|---|---|---|---|---|---|
| Diethyl maleate | 1.0 | $CH_2Cl_2$ | 45 | 3 | 79 | 1,2,3-tris(carbethoxy)cyclopropane. |
| Isopropylidinemalononitrile | 1.0 | Benzene | 45–25 | 18 | 85 | 1-carbethoxy-2,2-dicyano-3,3-dimethylcyclopropane. |
| Ethyl isopropylidinecyanoacetate | 1.0 | ...do... | 45–25 | 18 | 91 | 1,2-bis(carbethoxy)-1-cyano-3,3-dimethylcyclopropane. |
| Diethyl ethylidinemalonate | 1.0 | ...do... | 42–25 | 18 | 90 | 1,1,2-tris(carbethoxy)-3-methylcyclopropane. |
| Diethyl isopropylidinemalonate | 1.0 | ...do... | 50 | 18 | 65 | 1,1,2-tris(carbethoxy)-3,3-dimethylcyclopropane. |

TABLE IV

| Reactant | Mole Ratio | Solvent | Temp., °C. | Time, hrs. | Yield, percent | Product |
|---|---|---|---|---|---|---|
| Ethyl Acrylate | 2.0 | $CHCl_3$ | 60 | 6 | 71 | 1-benzoyl-2-carbethoxycyclopropane. |
| Acrolein | 0.8 | Acetone | 55–25 | 18 | 41 | 1-benzoyl-2-formylcyclopropane. |
| Acrylonitrile | 2.0 | $CHCl_3$ | 60 | 6 | 41 | 1-benzoyl-2-cyanocyclopropane. |
| Methyl vinyl ketone | 3.0 | Benzene | 80 | 4 | 75 | 1-acetyl-2-benzoylcyclopropane. |
| Diethyl ethylidinemalonate | 3.0 | ...do... | 20 | 24 | 40 | 1-benzoyl-2,2-bis(carbethoxy)-3-methylcyclopropane. |
| Ethylidinemalononitrile | 0.5 | ...do... | 20 | 24 | 40 | 1-benzoyl-2,2-dicyano-3-methylcyclopropane. |
| Diethyl fumarate | 1.0 | Toluene | 110 | 2 | 65 | 1-benzoyl-2,3-dicarbethoxycyclopropane. |

TABLE V

| Reactant | Mole Ratio | Solvent | Temp., °C. | Time, hrs. | Yield, percent | Product |
|---|---|---|---|---|---|---|
| Ethyl acrylate | 2.0 | $CHCl_3$ | 25 | 18 | 31 | 1-carbethoxy-2-cyanocyclopropane. |
| Methyl vinyl ketone | 2.0 | $CHCl_3$ | 25–30 | 18 | 72 | 1-acetyl-2-cyanocyclopropane. |
| Methacrolein | 2.0 | $CHCl_3$ | 25–30 | 18 | 34 | 1,2-dicyano-2-methylcyclopropane. |
| Diethyl ethylidinemalonate | 1.0 | $CHCl_3$ | 35–25 | 18 | 70 | 1,1-bis(carbethoxy)-2-cyano-3-methylcyclopropane. |
| Isopropylidinemalononitrile | 1.0 | Acetone | 35–25 | 18 | 78 | 1,1-dimethyl-2,2,3-tricyanocyclopropane. |

The following products whose production is illustrated in Table III are believed to be novel compounds: 1-carbethoxy - 2,2-dicyano-3,3-dimethylcyclopropane, B.P. 93–94° C. at less than 1 mm., $n_D^{25}$ 1.4624; and 1,2-bis-(carbethoxy)-2-cyano - 3,3-dimethylcyclopropane, B.P. 104–106° C. at less than 1 mm., $n_D^{25}$ 1.4560.

Example VIII

A series of runs was made wherein (dimethylthioxo) acetophenone was reacted with various olefinic reactants in the presence of various solvents under varying reaction conditions. The results of this series are shown in Table IV wherein the column headings have the same significance as those of Table II.

The following products whose production is illustrated in Table IV are believed to be novel compounds: 1-benzoyl-2-formylcyclopropane, B.P. 101–103° C. at 0.1 mm., $n_D^{25}$ 1.5645; 1-benzoyl - 2,2-bis(carbethoxy) - 3-methylcyclopropane, B.P. 130–140° C. at 0.1 mm., $n_D^{25}$ 1.5080; and 1-benzoyl - 2,2-dicyano - 3-methylcyclopropane, M.P. 101–104° C.

Example IX

A series of runs was made wherein (dimethylthioxo) acrylonitrile was reacted with various olefinic reactants in the presence of various solvents under varying reaction conditions. The results of this series are shown in Table V wherein the column headings have the same significance as those of Table II.

The following products whose preparation is illustrated in Table V are believed to be novel compounds: 1,1-bis (carbethoxy)-2-cyano-3-methylcyclopropane, B.P. 87° C. at 0.1 mm., $n_D^{25}$ 1.4488; and 1,1-dimethyl-2,2,3-tricyanocyclopropane, M.P. 121–122° C.

I claim as my invention:

1. The process of producing a cyclopropane derivative represented by the formula

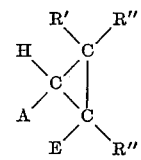

wherein R', R", A and E are defined hereinbelow by reacting (a) the sulfur ylid of up to 15 carbon atoms of the formula

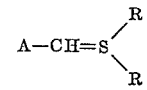

wherein R independently is lower alkyl and A is an electron-withdrawing group selected from cyano, alkanoyl, aryloyl, carbalkoxy, N,N-dialkylcarbamyl and carbaryloxy, and (b) the olefinic reactant of up to 20 carbon atoms of the formula $(R')(R'')C=C(R'')E$ wherein E is an electron-withdrawing group selected from formyl, alkanoyl, aryloyl, dialkylphosphono, carboxy, alkylsulfonyl, arylsulfonyl, alkylsulfonate, nitro, NN-dialkylcarbamyl cyano, carbalkoxy and carbaryloxy, R' is hydrogen, a non-acetylenic hydrocarbyl organic moiety of up to 10 carbon atoms or a non-acetylenic substituted-hydrocarbyl organic moiety of up to 10 carbon atoms containing up to 3 substituents selected from E and halogens of atomic number from 17 to 35 inclusive, and R'' is E or R', with the proviso that no more than one R'' group is E and with the further proviso that when two E groups are substituents of the same carbon atom at least one E is other than alkanoyl or aryloyl, in the liquid phase at a temperature from about 0° C. to about 150° C.

2. The process of claim 1 wherein each R is methyl.

3. The process of claim 2 wherein the olefinic reactant is of the formula

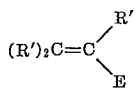

wherein E is cyano, alkanoyl, aryloyl, carbalkoxy or carbaryloxy.

4. The process of claim 3 wherein each R' is hydrogen.

5. The process of claim 4 wherein the ylid is ethyl (dimethylthioxo)acetate and the olefinic reactant is ethyl acrylate.

6. The process of claim 4 wherein the ylid is ethyl (dimethylthioxo)acetate and the olefinic reactant is 2,5-dimethyl-4-hexen-3-one.

7. The process of claim 2 wherein the olefinic reactant is of the formula $(R')(E)C=C(R')E$ wherein E is cyano, alkanoyl, aryloyl, carbalkoxy or carbaryloxy.

8. The process of claim 7 wherein the E substituent of the olefinic reactant is carbalkoxy and R' is hydrogen.

9. The process of claim 8 wherein the ylid is ethyl (dimethylthioxo)acetate.

10. The process of claim 2 wherein the olefinic reactant is of the formula $(R')_2C=C(E)_2$ wherein E is cyano, alkanoyl, aryloyl, carbalkoxy or carbaryloxy.

11. The process of claim 10 wherein the ylid is (dimethylthioxo)acetonitrile and the olefinic reactant is ethylidenemalononitrile.

References Cited

Franzen et al.: Chem. Ber., 96, p. 1886, (1963).
Corey et al.: Journal of American Chem. Soc., 84, pp. 3782–3783.
Johnson et al.: Journal of Am. Chem. Soc., 86, p. 919.
Bonavent et al.: Bull. Soc. Chim. France, pp. 2462–2471, (1964).

CHARLES B. PARKER, *Primary Examiner.*

S. T. LAWRENCE III, *Assistant Examiner.*